Feb. 14, 1928.

M. REIN

SPINACH CLEANER

Filed March 26, 1927

1,659,473

WITNESSES
E. A. Wilson
S. W. Foster

INVENTOR
MARK REIN
BY Munn & Co.
ATTORNEY

Patented Feb. 14, 1928.

1,659,473

UNITED STATES PATENT OFFICE.

MARK REIN, OF BROOKLYN, NEW YORK.

SPINACH CLEANER.

Application filed March 26, 1927. Serial No. 178,767.

This invention relates to spinach cleaners, an object of the invention being to provide an improved construction designed in the shape of a receptacle, having a controlled drain outlet which permits the easy, rapid and most effectual cleaning of spinach so that every particle of dirt, sand and grit can be removed and a perfectly clean food product had.

It is a well known fact that great difficulty and a great deal of time is wasted in properly cleaning spinach. Some spinach is very dirty, containing sand and grit, but all spinach needs thorough cleaning before use, and it is the object of my invention to provide a device which not only reduces labor but makes the operation an extremely efficient one.

With these and other objects in view, the invention consists in certain novel features of construction and combinations and arrangements of parts, which will be more fully hereinafter described and pointed out in the claims.

In the accompanying drawings—

My improved spinach cleaner comprises a receptacle 1 which may be of metal or any other suitable material and is preferably elongated, having a general elliptical form in plan, and may be provided with suitable handles 2 at its ends for conveniently manipulating the same.

Figure 1:
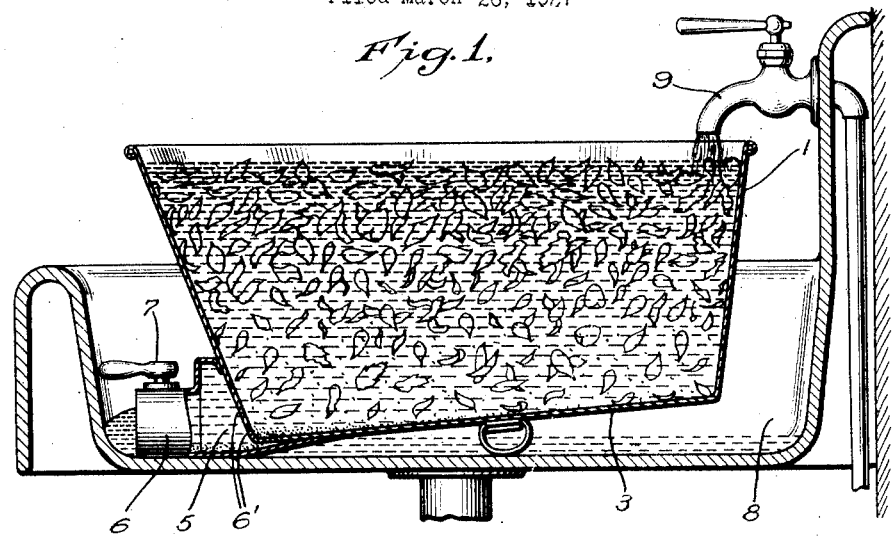
Figure 1 is a view in vertical section, illustrating my improved cleaner in operative position in an ordinary sink.
Figure 2:
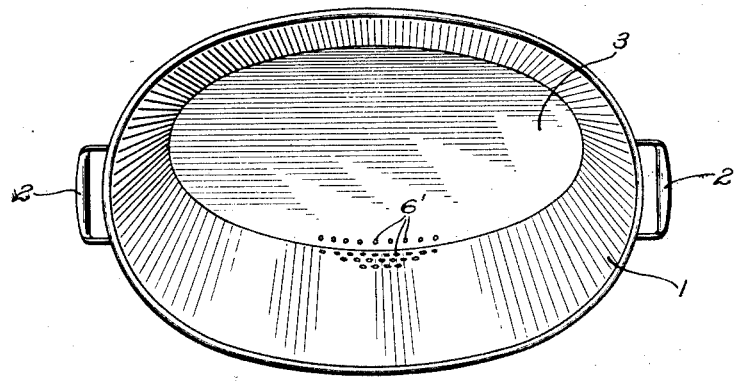
Figure 2 is a plan view of the cleaner.
Figure 3:
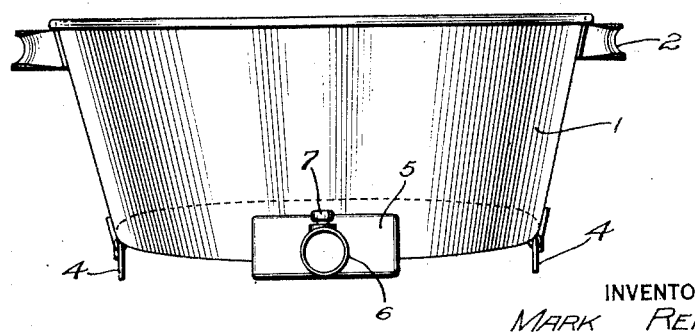
Figure 3 is a view in front elevation of the cleaner.

An inclined or sloping bottom 3 is formed on the receptacle 1, and hinged feet or links 4 are connected to the bottom and end portions of the receptacle 1, so that when these feet are in vertical position the receptacle may be supported at an incline, as clearly shown in Figure 1. When not in use, these feet may be swung upward, outward or inwardly against the bottom, as desired, so as to allow the receptacle to rest flat upon the bottom.

5 represents an outlet compartment which is secured to the lowest central portion of the front wall of the receptacle 1 and extends partially under the bottom of the receptacle. Said bottom and said wall of the receptacle are made with perforations 6' through which water and dirt may pass from the receptacle 1 into the outlet compartment 5. This outlet compartment 5 has a drain spout 6 which may be closed by a cock or valve 7, or any other suitable device may be employed to open and close the spout 6.

In operation the device may be located in a sink 8, such as indicated in Figure 1, and in position for the water from a faucet 9 to flow into the receptacle.

In carrying out the operation of cleaning spinach, the valve 7 is closed to close the outlet 5 and the spinach is located in the receptacle 1. The faucet 9 is then opened to allow the water to flow into the receptacle 1 until the desired level of water is reached in the receptacle, then the cock 7 is opened and the water with the dirt therein is allowed to flow out as fast as it flows into the receptacle. This regulation is easily controlled as the leaves of the spinach have a tendency to close the perforations 6', and by moving, stirring and washing these leaves there may be a continuous flow of water over the spinach and out through the spout 6. This may be kept up as long as desired, and then the spout 6 and the faucet 9 may be closed, the feet 4 swung aside, and the receptacle 1 allowed to rest flat on the bottom. The spinach may be washed in the now standing water for a certain length of time and the water permitted then for a while to become still; then the operator may test the cleanliness of the spinach by placing his hand in the receptacle and feeling with his fingers the now straight bottom thereof to see if there is any dirt, grit or sand on the bottom of the receptacle. If there is, he supports the receptacle at the former incline, opens the outlet and the faucet, and continues the operation as before until every particle of dirt or grit is removed from the spinach.

The time consumed in carrying out the operation in washing spinach is very much less than heretofore required, the work is efficiently done, and there is no changing of the spinach from one receptacle to another such as commonly done heretofore.

The inclined receptacle prevents the loosened dirt from coming again into contact with the leaves as is the case in the usual methods of washing in two vessels.

I have described one operation of cleaning but it is to be distinctly understood that the apparatus is capable of various operations in accordance with the character and material being operated upon, and while I have illustrated what I believe to be a preferred embodiment of my invention it is obvious that various changes and alterations might be made in the general form of the parts described without departing from the invention and hence I do not limit myself to the precise details set forth but consider myself at liberty to make such changes and alterations as fairly fall within the spirit and scope of the appended claims.

I claim:

1. A spinach cleaner, comprising a receptacle having perforations in a wall thereof constituting an outlet, said receptacle having a flat bottom on which the receptacle rests when in horizontal position, movable feet at the sides of the receptacle adapted when in normal position to support the bottom of the receptacle at an incline sloping downwardly toward the said outlet, an outlet chamber communicating with the perforations in the receptacle and adapted to receive grit and dirt from the receptacle, and a valve controlling the outlet of said chamber.

2. A spinach cleaner, comprising a receptacle having perforations in a wall thereof constituting an outlet, said receptacle having a flat bottom on which the receptacle rests when in horizontal position, movable feet at the sides of the receptacle adapted when in normal position to support the bottom of the receptacle at an incline sloping downwardly toward the said outlet, an outlet chamber communicating with the perforations in the receptacle and adapted to receive grit and dirt from the receptacle, and a valve controlling the outlet of said chamber, said receptacle having its wall at the outlet end higher than the other portion of the wall whereby the receptacle will contain a maximum of water when in inclined position.

MARK REIN.